US008912880B2

(12) United States Patent
Ritter

(10) Patent No.: US 8,912,880 B2
(45) Date of Patent: Dec. 16, 2014

(54) METHOD FOR CHECKING THE AUTHORIZATION OF USERS

(75) Inventor: Rudolf Ritter, Zollikofen (CH)

(73) Assignee: Swisscom AG (CH)

( * ) Notice: Subject to any disclaimer, the term of this patent is extended or adjusted under 35 U.S.C. 154(b) by 1216 days.

(21) Appl. No.: 11/449,096

(22) Filed: Jun. 8, 2006

(65) Prior Publication Data
US 2006/0238298 A1    Oct. 26, 2006

Related U.S. Application Data

(60) Division of application No. 09/998,256, filed on Nov. 30, 2001, now Pat. No. 7,084,736, which is a continuation of application No. PCT/CH99/00298, filed on Jul. 6, 1999.

(51) Int. Cl.
| | | |
|---|---|---|
| *G06K 5/00* | (2006.01) | |
| *H04K 1/00* | (2006.01) | |
| *G07F 7/10* | (2006.01) | |
| *G06Q 20/40* | (2012.01) | |
| *G07B 15/00* | (2011.01) | |
| *G06Q 20/34* | (2012.01) | |
| *G07C 9/00* | (2006.01) | |
| *H04M 1/675* | (2006.01) | |

(52) U.S. Cl.
CPC ............ *G06Q 20/341* (2013.01); *G07F 7/1008* (2013.01); *G06Q 20/40* (2013.01); *G06Q 20/40145* (2013.01); *G07B 15/00* (2013.01); *G07C 9/00166* (2013.01); *G07C 9/00079* (2013.01); *G06Q 20/4014* (2013.01); *H04M 1/675* (2013.01)
USPC ............ 340/5.2; 340/5.52; 340/5.83; 455/411

(58) Field of Classification Search
CPC .............. G06K 5/00; H04K 1/00; H04Q 7/30
USPC ............ 340/5.2, 5.52, 5.53, 5.83; 380/23, 24, 380/247; 395/10, 12; 713/188, 186; 382/117; 455/411, 90, 566, 575, 550; 235/375, 376, 382
See application file for complete search history.

(56) References Cited

U.S. PATENT DOCUMENTS

| 4,595,990 A | * | 6/1986 | Garwin et al. ................. 708/141 |
| 4,977,501 A | | 12/1990 | Lefevre ............................ 705/13 |

(Continued)

FOREIGN PATENT DOCUMENTS

| DE | 297 07 353 U1 | 6/1997 |
| EP | 0 564 940 A1 | 10/1993 |

(Continued)

OTHER PUBLICATIONS

Haartsen, J.: "Bluetooth—The Universal Radio Interface for Ad Hoc, Wireless Connectivity", Ericsson Review, SE Ericsson, Stockholm, No. 3, Jan. 1998.

*Primary Examiner* — Nam V Nguyen
(74) *Attorney, Agent, or Firm* — McAndrews, Held & Malloy, Ltd.

(57) ABSTRACT

In order to check the authorization of passengers, the following steps are performed:
storing of authorization data, for example of tickets, in an electronic storage area of a portable personal identification module (40) of the user, for example in a chip-card,
storing of identification data that are specific to the user's outer appearance in an electronic storage area of the personal identification module (40),
contactless transmission of said identification and authorization data in a portable authorization-checking device (90),
visual reproduction of said identification and authorization data with a VRD (Virtual Retina Display).

8 Claims, 5 Drawing Sheets

(56) References Cited

U.S. PATENT DOCUMENTS

| | | | |
|---|---|---|---|
| 5,027,401 A * | 6/1991 | Soltesz | 380/54 |
| 5,036,461 A | 7/1991 | Elliott et al. | 705/44 |
| 5,051,565 A * | 9/1991 | Wolfram | 235/384 |
| 5,095,196 A | 3/1992 | Miyata | 235/382 |
| 5,131,038 A | 7/1992 | Puhl et al. | |
| 5,259,025 A * | 11/1993 | Monroe et al. | 705/75 |
| 5,337,358 A | 8/1994 | Axelrod et al. | 705/75 |
| 5,600,708 A * | 2/1997 | Meche et al. | 455/411 |
| 5,689,619 A * | 11/1997 | Smyth | 706/45 |
| 5,754,675 A * | 5/1998 | Valadier | 382/115 |
| 5,867,795 A * | 2/1999 | Novis et al. | 455/566 |
| 5,954,583 A * | 9/1999 | Green | 463/29 |
| 5,990,882 A * | 11/1999 | Heinonen et al. | 725/133 |
| 6,043,799 A | 3/2000 | Tidwell | 345/7 |
| 6,084,967 A * | 7/2000 | Kennedy et al. | 380/247 |
| 6,085,976 A | 7/2000 | Sehr | 235/384 |
| 6,137,895 A | 10/2000 | Al-Sheikh | 382/115 |
| 6,149,272 A | 11/2000 | Bergner et al. | 351/221 |
| 6,366,622 B1 | 4/2002 | Brown et al. | 375/322 |
| 6,396,461 B1 * | 5/2002 | Lewis et al. | 345/7 |
| 6,417,797 B1 | 7/2002 | Cousins et al. | 342/179 |
| 6,483,930 B1 * | 11/2002 | Musgrave et al. | 382/117 |
| 6,484,260 B1 * | 11/2002 | Scott et al. | 713/186 |
| 6,556,820 B1 * | 4/2003 | Le et al. | 455/411 |
| 6,766,039 B1 * | 7/2004 | Al-Sheikh | 382/115 |
| 7,114,179 B1 * | 9/2006 | Ritter et al. | 726/7 |
| 7,137,553 B2 * | 11/2006 | Register et al. | 235/382.5 |
| 7,344,068 B2 * | 3/2008 | Register et al. | 235/382 |
| 7,762,456 B2 * | 7/2010 | Register et al. | 235/382 |

FOREIGN PATENT DOCUMENTS

| | | |
|---|---|---|
| GB | 2 267 626 A | 12/1992 |
| JP | 57 211679 A | 12/1982 |
| JP | 10 340356 A | 12/1998 |
| WO | WO 93/20539 | 10/1993 |

\* cited by examiner

METHOD FOR CHECKING THE AUTHORIZATION OF USERS

CROSS REFERENCE TO RELATED APPLICATION

This application is a divisional of U.S. Pat. No. 7,084,736, filed on Nov. 20, 2001, as a continuation of PCT/CH99/00298, filed on Jul. 6, 1999.

FIELD OF THE INVENTION

The present invention concerns a method for checking the authorization of persons, for example the authorization of users of public transportation or of public places such as airports, cinemas, theaters, exhibitions etc.

RELATED ART

Electronic systems and methods are known for checking the authorization of persons to be allowed to use services they need and if necessary for billing the use of these services. The patent document EP0465456 describes for example a system for billing the use of public transportation. Trains or buses are equipped at the doors with readers in order to record the ingress and egress of passengers who have been provided with a contactless chip-card. The passengers' time of ingress and egress is forwarded to a central that determines with the aid of a timetable the traveled distance and that bills the latter to the passengers on a monthly basis.

The system described in EP0465456 has the disadvantage that billing on the basis of a timetable may lead to incorrect results when delays occur in the traffic network. Furthermore, this system is suitable only for determining and billing the use of specially equipped vehicles in which the travel authorization is checked only at the doors. In many complex traffic networks, it is however not possible or desirable to forgo in all vehicles the manual checking of tickets. Equipping older vehicles with readers at the doors often involves a lot of expenditure. Furthermore, the passengers often require controllers in the trains in order to receive travel information and to ensure security in night subway trains. Moreover, this system can be outsmarted by passengers who for example slip their chip-card through a window rather than through the door.

It is an aim of the present invention to propose new and better methods and systems for checking the users' authorization, for example the travel authorization of passengers. In particular, it is an aim of this invention to propose a new method and a new system that make it possible for a controller to check the user authorization, for example a travel authorization stored in a portable identification module.

DE-U1-29707353 describes an identification system for the storage and recognition of data patterns. The identification of the users is stored with a photograph in an electronic device and can be checked at fixed authorization offices. This system is not suitable for having the travel authorization checked easily by a controller in the vehicle.

WO93/20539 describes a parking system in which a car-park attendant can check with a portable computer whether every car in the parking has paid the required fee. This system is not suitable for checking tickets in public transportation. In particular, it is not easy for a controller to check the authorizations while moving.

Patent Abstracts of Japan, Vol. 1999, N° 03, 31 Mar. 1999 and JP-10-340356 describe a system for having tickets checked by a controller in a train. The controller receives a signal that indicates whether a ticket is valid. This system is not easy for the controller who has to check the authorizations of several users while moving.

BRIEF SUMMARY OF THE INVENTION

According to the present invention, these aims are achieved in particular through the characteristics of the independent claims. Further advantageous embodiments are moreover described in the dependent claims and in the description.

In particular, these aims of the invention are achieved by storing the identification data and authorization data of users in an electronic storage area of a personal identification module of the user and then forwarding them contactlessly to a portable authorization-checking device for reproduction. This has the advantage that a controller in a vehicle can check the passengers' authorization data that are stored in the passengers' personal terminals without the passengers having to present their identification module. Furthermore, this has the advantage that contactless identification modules designed for the automatic checking and billing by readers at the doors of the vehicle can also be checked manually by a controller.

The users' identification module can for example be in the form of a chip-card. In a preferred embodiment it contains an additional radio receiver, with which data from an external sender, for example a radio sender, can be received, as well as reproduction means, for example a display and/or headphones, with which these data can be reproduced. In this manner, the authorization data stored in the identification module can also be modified "over-the-air", for example with program-accompanying data.

The identification module comprises preferably input means, for example a keyboard and/or a touch-screen, with which data can be entered. Chip-cards with a keyboard are described among others in patent application EP0813171. In this manner, confirmations to debit an account or the booking of a seat can be entered and forwarded over said contactless interface. Certain identification modules, for example stolen ones, can also be blocked in this manner.

The authorization-checking device is portable and electrically autonomous. It comprises visual reproduction means with which identification data and authorization data can be displayed. These reproduction means consist of a VRD (Virtual Retina Display).

The identification data include biometric parameters of the user of the identification module. For example, these data include a photograph of the user that can be transmitted over the contactless interface and displayed on said authorization-checking device. In this manner, the controller can check whether the identification module really belongs to the user.

DESCRIPTION OF THE DRAWINGS

Preferred embodiments of the invention will be described hereafter in more detail with the aid of the attached drawings, in which.

DETAILED DESCRIPTION OF THE INVENTION

Figure 1:
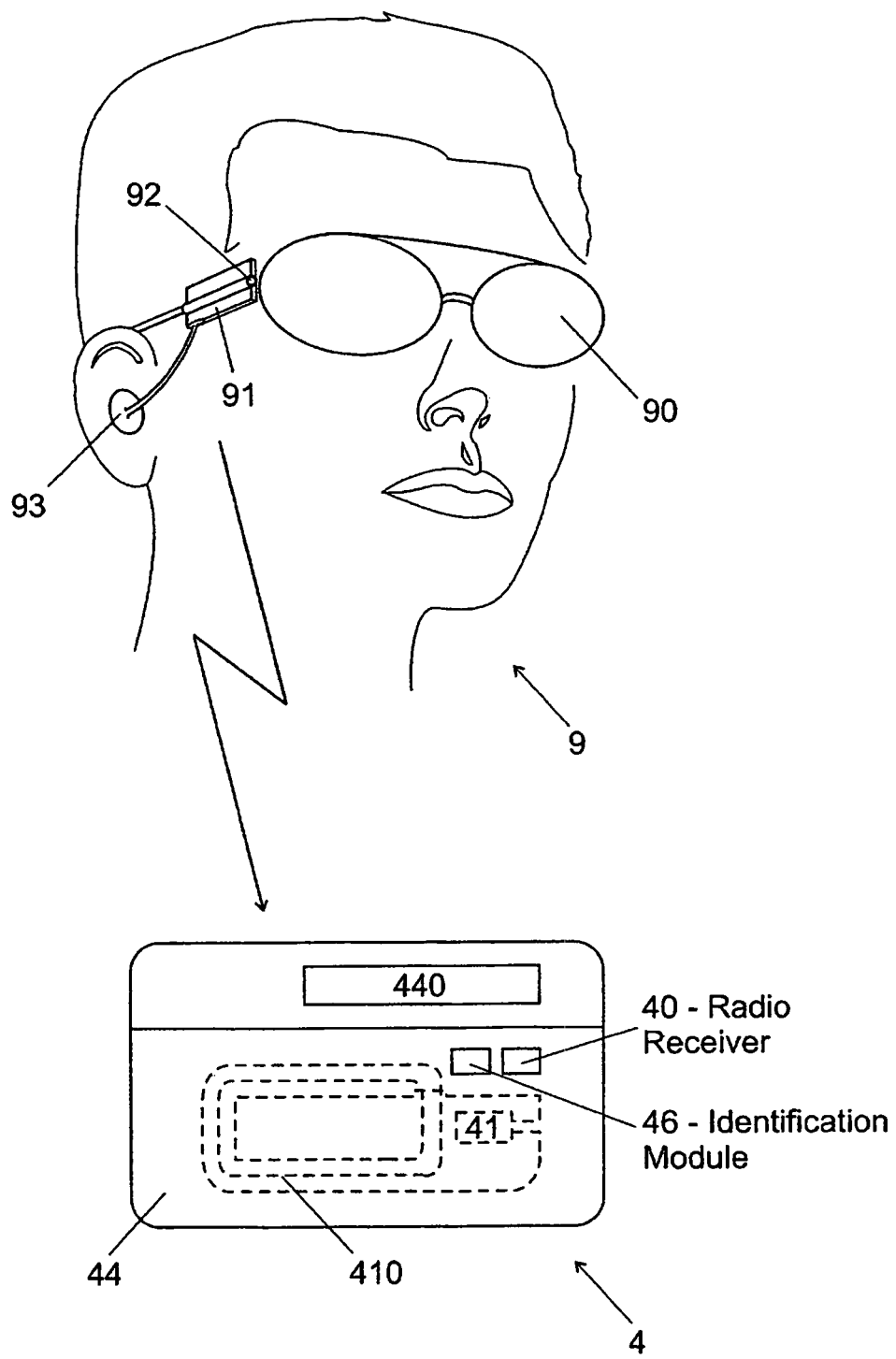
FIG. 1 shows a diagrammatic view of an identification module, in this example a contactless chip-card, with an authorization-checking device, in this example glasses with a VRD.

FIG. 1 shows diagrammatically the terminal 4, in this example a chip-card 44, of a user, for example a passenger, and the authorization-checking device 90 that is carried by a controller 9. Although the description shows in detail the example of checking tickets in a public transportation vehicle, for example in a bus, train, boat, airplane or subway train, this invention can also be used for checking other kinds of authorizations, for example admission tickets for cinemas, theaters, exhibitions etc., for checking driver's licenses, for ski lifts etc.

Every terminal includes an identification module 40 in which user-specific data are stored, as well as a contactless interface 41 over which a local radio connection can be established. The contactless interface allows a radio connection at close range (typically up to a maximum of 20 meters) and comprises preferably a chip, for example a RFID (Radio Frequency Identification) chip, and an antenna 410, for example a coil. The chip comprises a radio part and data processing means and can send and receive data in a defined frequency range, for example in an ISM (Industrial Scientific and Medical Applications) range or in a frequency range between 2.4 to 2.5 GHz. Depending on the frequency used, the antenna 410 can also be integrated in the chip or consist of a wound coil.

Identification data and authorization data of the user are stored in various storage areas in the identification module. The user's identification data comprise preferably the user's identity, for example his name and/or user number. If the identification module 40 can also be used as a SIM (Subscriber Identification Module) card in a mobile telephone, the user's identity can also consist of his IMSI (International Mobile Subscriber Identification) number in the mobile radio network. In a variant embodiment, the identification data comprise also biometric parameters of the user, for example a photograph, voice parameters, iris and/or retina parameters, a finger print etc. With these biometric parameters, it can be reliably determined whether the user of the identification module is also the rightful owner.

Depending on the application, the authorization data can include different types of data. If the identification module 40 is used for identifying passengers in public transportation, the authorization data comprise for example the type and validity of the user's ticket or season ticket, his seat bookings, possible blocking data if the season ticket has been blocked etc. These data are preferably stored in a secured area of the module that cannot be modified by the user alone.

The identification data, for example the name, the user number and/or the user's biometric parameters, as well as the authorization data, for example the data relating to the season ticket, can be printed on an area 440 of the chip-card's surface, so that the identification module can be checked by a visual inspection and without authorization-checking device.

The contactless interface 41 preferably allows a bidirectional data transfer with external devices, among others with an authorization-checking device 90. Preferably, a standardized protocol is used for this interface, for example a wireless networking protocol such as Bluetooth® or HomeRF®, so that standardized terminals 4 can be used. The contactless interface 41 can also consist of a RFID (Radio Frequency Identification) element. According to the embodiment, the terminal 4 has its own energy supply means, for example a battery or solar cell, or can be powered by the external device 90. In a variant embodiment, the terminal 4 is powered by transparent solar cells in the user's glasses.

Over the contactless interface 41, the external portable authorization-checking device 90 can access the user's identification and authorization data and reproduce these data optically and/or acoustically. The authorization-checking device comprises a housing 91 with a contactless interface using the same protocol and the same frequency as the identification module 40. The housing 91 accommodates the entire electronics (contactless interface, data processing means, battery and/or solar cells, optional additional radio receiver etc.).

In the represented example, the authorization-checking device 90 is integrated in glasses that are worn by a controller 9. The authorization-checking device comprises a VRD (Virtual Retina Display) device 92 that projects an image directly onto the retina of the user 9. Such VRD devices are proposed among others by the firm Microvision and have the advantage that they can be greatly miniaturized and that they have a low energy consumption. The projected image can superimpose over the image seen by the controller 9. Headphones 93 can furthermore reproduce the transmitted data acoustically, for example with a voice synthesizer.

The authorization-checking device 90 can have controls (not represented), for example keys and/or a touch-screen, with which the controller can for example have the identification and/or authorization data read and have all identification modules scanned. In a preferred embodiment of the invention, the authorization-checking device 90 is controlled by the eye of the user 9, who can give for example context-dependent commands by looking in predefined directions. Devices that react to the position of the eye are already used in photographic cameras and video apparatus.

In a preferred embodiment of the invention, the controller 9 can enlarge and/or enhance part of the projected image by looking during a certain time in the direction of this part of the image. In a variant embodiment, the authorization-checking device receives in a first stage for example an image generated in the data processing means in the housing 91, and representing a list of identification data of all identification modules 4 in radio contact with the authorization-checking device 90. The controller sees for example a mosaic with photographs of all passengers in the vicinity. The controller can then decide to view the identification and authorization data of a specific passenger by looking during a certain time in the direction of the represented image of this passenger. The authorization-checking device then requests from the identification module 4 of the selected passenger that it should send the queried authorization data or additional identification data, which are then, in a second stage, reproduced to the controller in a second image.

In a variant embodiment, the controller cannot access the user-specific data of this user without the latter's consent. In order for at least certain data to be read, the reading of these data must in this variant embodiment be approved by the user through a release key.

In a variant embodiment of the invention, at least certain identification modules include a stored electronic account that can be loaded resp. debited with a teller and/or "over-the-air". If the authorization-checking device 90 has controls, the controller can preferably debit this account with a corresponding command, for example if the user has not acquired in advance a travel authorization. Preferably, the controller 9 sends to this effect a debit query to the terminal 4 that has to be confirmed by the user before the electronic money is transferred over said contactless interface to the authorization-checking device 90.

Figure 2:
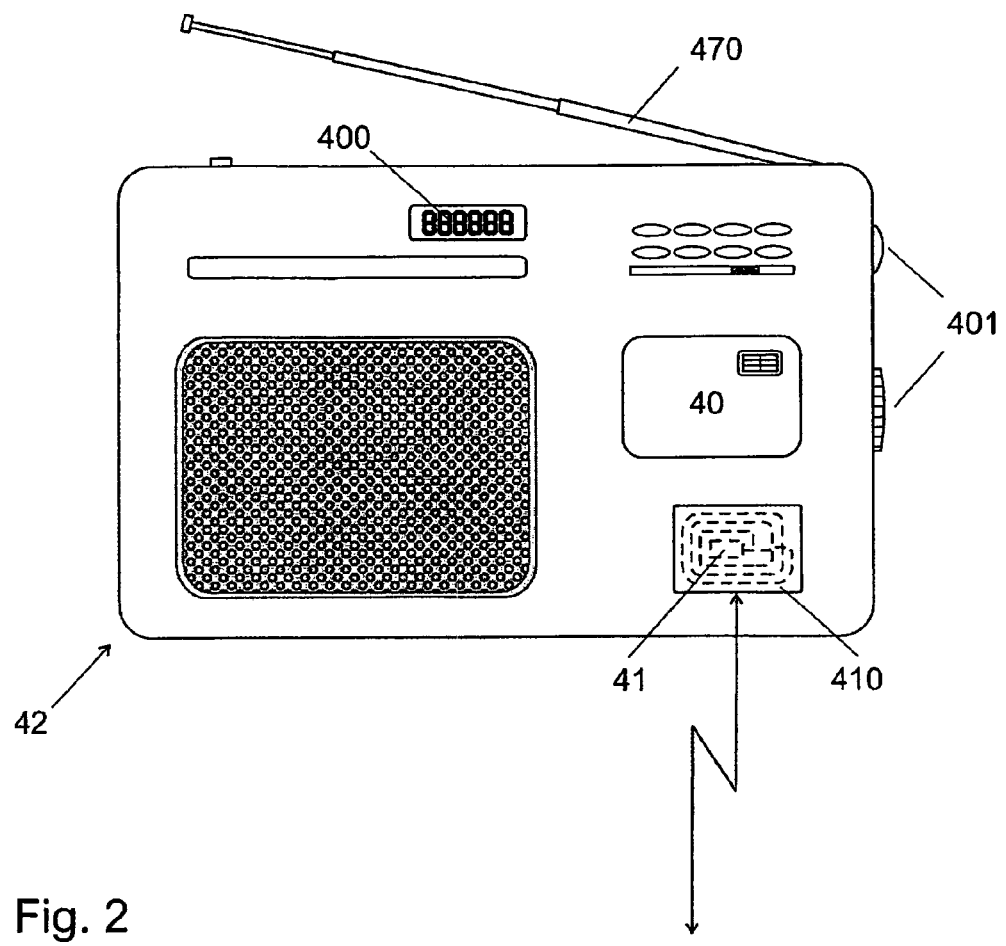
FIG. 2 shows a diagrammatic view of another embodiment of an identification module, here in the form of a portable radio receiver.
Figure 3:
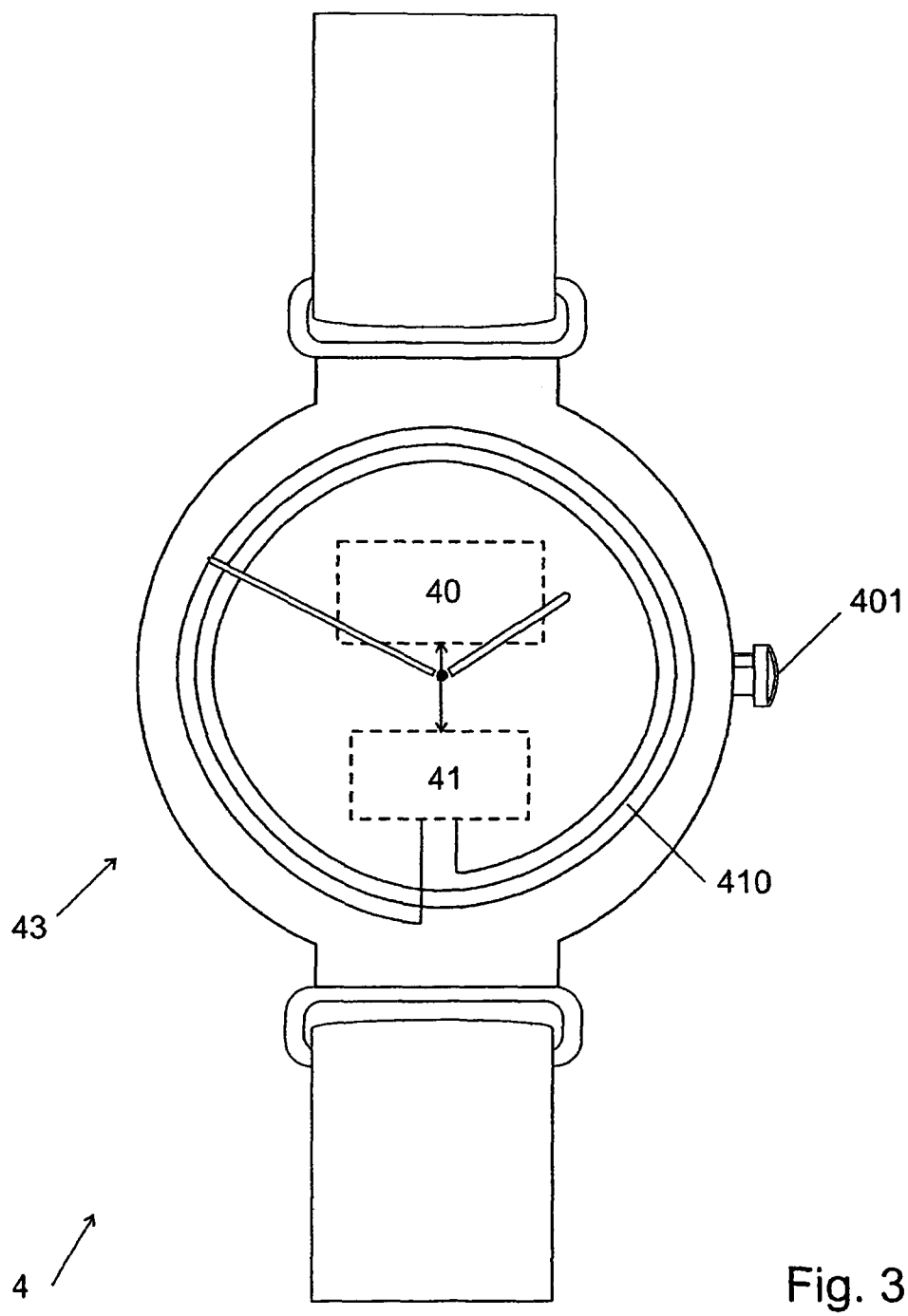
FIG. 3 shows a diagrammatic view of another embodiment of an identification module, here in the form of a wristwatch.

In a variant embodiment of the invention, at least part of the terminals 4 have an additional radio receiver 46 over which data from an external sender 1 (FIG. 5) can be received. In this case, the identification module 40 can also be integrated in a radio receiver, for example in a portable radio receiver 42 (FIG. 2), in a mobile telephone (not represented), in a palmtop or laptop computer (not represented), or in a wristwatch 43 (FIG. 3). Terminals of different types can also be combined within a single vehicle. According to the embodiment, the terminal can have different data reproduction means 400, for example a display and/or headphones, and different input means 401, for example a keyboard, a touch-screen and/or an apparatus for determining the position of the eye. The display can be for example a LCD and/or preferably a VRD (Virtual Retina Display) and thus reproduce the operating status as well as received images and texts.

If the terminal 4 is sufficiently voluminous, the user identification data and/or the authorization data can be stored in a removable chip-card, for example in a SIM (Subscriber Identification Module) card. In this manner, for example the authorization, for example a ticket, can be sold in the form of a chip-card that the users need only insert in their terminal. Alternatively, the identification and authorization data can also be stored in a secured storage area (virtual SIM card) or in a removable electronic module of the terminal 4.

Electronic encryption and signature means are preferably provided in the terminals 4 and in the authorization-checking device 90 in order to encrypt the data transmitted over said contactless interface and to sign these data electronically. For this purpose, TTP (Trusted Third Party) services are preferably used. The identification module in the terminal preferably includes an electronic certificate with which an end-to-end encryption up to the controller 9 can be guaranteed. In this manner it can be ensured that only the controller 9 can access possibly confidential data in the identification modules 40.

Figure 4:
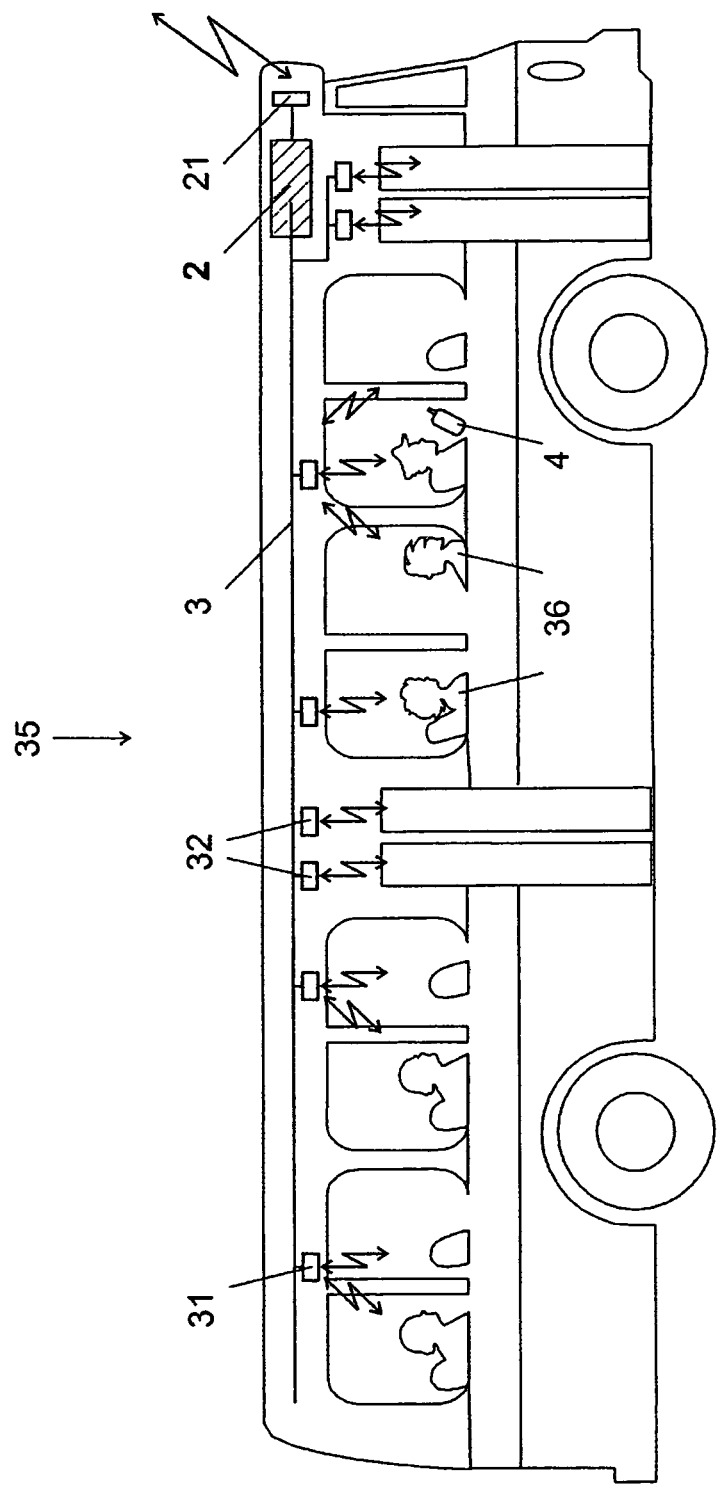
FIG. 4 shows a diagrammatic view of a vehicle, in this example a bus, with an information system in which the present invention can be used.

The system according to the invention can also be used in order to check the travel authorization at ingress and egress. FIG. 4 shows a vehicle, in this example a bus 35, with an information system in which the authorization-checking device according to the invention can be used. The information system in the vehicle comprises central data processing means 2, for example a computer with appropriate interfaces, or a digital radio receiver with a processor, as well as an electronic bus 3 that connects the central data processing means 2 with a plurality of transceivers 31, 32. Each transceiver has an antenna oriented in the direction of the passengers. Certain transceivers 32 are preferably installed close to the doors in order to monitor the ingress and egress of passengers.

The central data processing means 2 have at least one radio receiver 21 over which data from at least one sender 1, 7, 8 (FIG. 5) outside the vehicle can be received. According to the application, the radio receiver 21 can receive for example DAB (Digital Audio Broadcasting) including accompanying data, DVB (Digital Video Broadcasting) including accompanying data, GSM (Global System for Mobile Communications) or UMTS data including WAP data, GPS (Global Positioning System) data etc.

These different data can be converted in the data processing means 2 into another format, for example in the Bluetooth® format, and transmitted over the electronic bus 3 and the transceivers 31-32 to the passengers 36 in question.

When a passenger 36 enters the vehicle 35 with his terminal 4, his identification data stored in the terminal 4 are collected over said contactless interface and the transceiver 32 near the doors and transmitted to the data processing means 2.

According to the embodiment and application, the transmission of the identification parameters when entering or leaving the vehicle 35 can be triggered by the passengers or through the transceiver 32. The user identification data are read in the identification module 40 by a software program executed by the terminal 4 and transmitted by means of appropriate communication protocols over the contactless interface to the transceivers 32, where they are forwarded over the aforementioned electronic bus 3 to the central data processing means 2.

The data processing means 2 can receive over said additional radio receiver 21 a list of authorizations and/or a list of bookings and/or a list of barred passengers and thus establish whether the passenger is allowed to enter or whether the vehicle is barred to him. If the passenger is barred from the vehicle, the data processing means 2 can for example take appropriate measures in order to refuse access to the passenger, for example acoustic or optical warning signals can be activated and/or the relevant entrances closed resp. not opened. If the passenger is allowed to board, the passenger can enter the vehicle and take a seat. In the vehicle, additional transceivers 31 are provided that collect the identification parameters in the passenger's identification module 40 and forward them to the central data processing means 2. These data processing means can for example check whether the passenger is occupying the seat reserved for him in an allowed travel class. For this purpose, the transmitted authorization data can for example include booking information and/or travel class indications.

When the passenger is seated at his seat, he can receive data over the transceiver 31 and have them reproduced or processed on his personal terminal 4. The data received can include for example tourist information, advertising, music, entertainment programs etc. Certain data can be generated by the vehicle's driver and transmitted over the electronic bus 3 to every or to selected passengers. Other information, for example DAB or DVB programs and accompanying data received over the radio receiver 21, can be converted into an appropriate format, for example Bluetooth® format, and addressed to the passengers 36.

Figure 5:
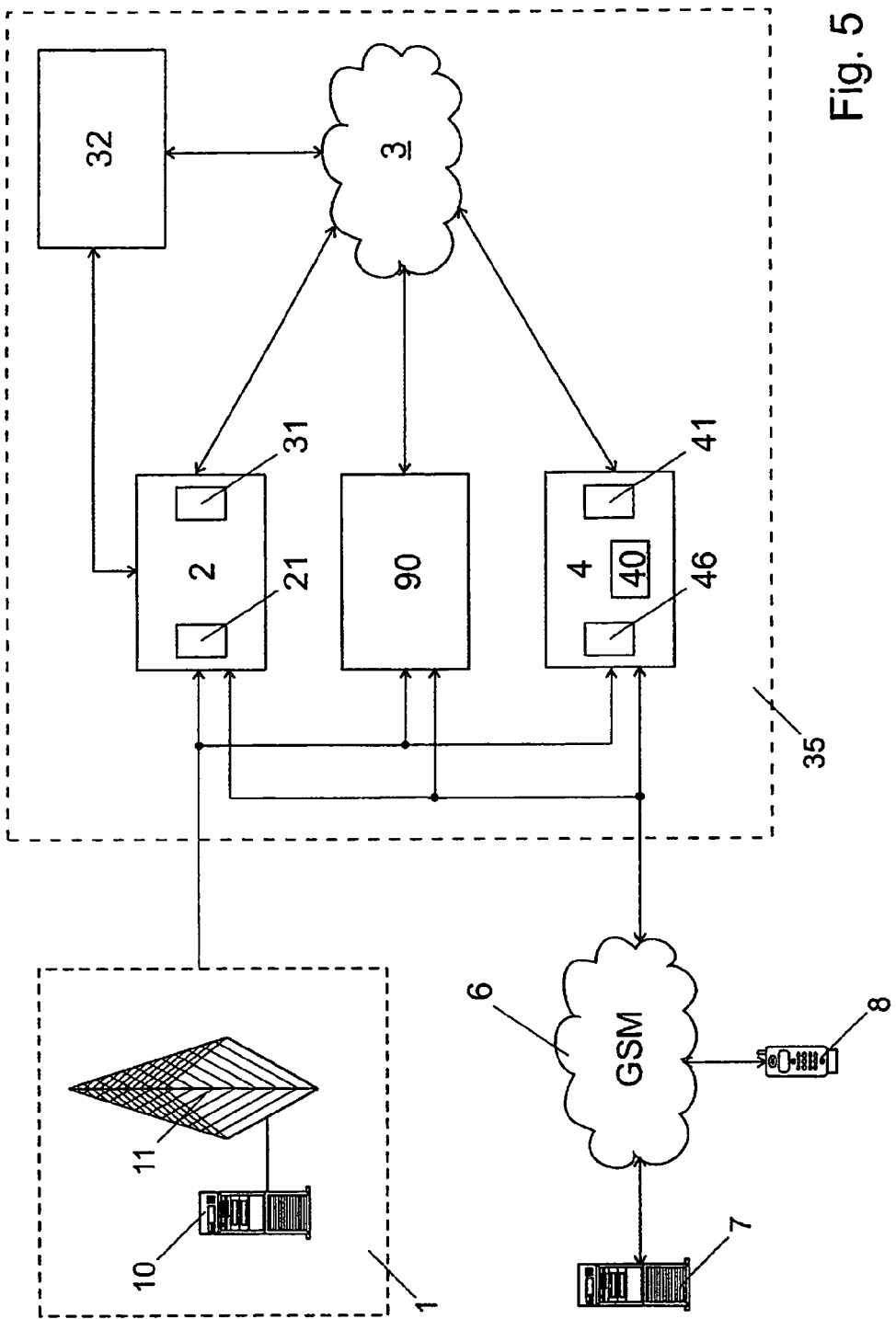
FIG. 5 shows a schematic block diagram of the system according to the invention.

FIG. 5 shows diagrammatically how a complete system for checking the travel authorization for users of public transportation can be created. In this example, the vehicle 35 comprises central data processing means 2 with at least one radio receiver 21 that can receive data from an external sender, for example from a DAB sender 1 and/or from a device 7, 8 connected to a mobile network. An electronic bus 3 is provided in the vehicle and connected with the central data processing means 2. On this bus, a plurality of transceivers 31, 32 on the vehicle and at the doors are connected, with which the users' terminals 4 can connect themselves contactlessly. A controller with an authorization-checking device 90 can connect over this contactless interface with the terminals in order to check the passengers' identification and authorization data.

The terminal 4 can receive data from an external sender 1, 7, 8 either over an integrated radio receiver 46 (radio, television or GSM) and/or over the electronic bus 3 and the central data processing means 2. The communication with external devices 7, 8 can also be bi-directional. Furthermore, new applications and data, for example timetables, new price lists etc., can also be downloaded in this manner in the terminal 4 and in the authorization-checking device 90. If a reverse channel is available, the user can in this manner also buy a new authorization and download for example new tickets, bookings etc.

The invention claimed is:

1. A method for verifying personal electronic authorization data stored in mobile devices, said method comprising:
   receiving via close range contactless communication at an authorization-checking device photographic identification data from one or more mobile devices, where said one or more mobile devices store authorization data and said photographic identification data associated with one or more users of said one or more mobile devices on a removable identification chipcard in said one or more mobile devices;
   displaying said photographic identification data visually on said authorization-checking device, wherein said visually reproduced photographic identification data provides a user of said authorization-checking device with a comparison of the appearance of said one or more users of said one or more mobile devices for verifying said stored authorization data is associated with said one or more users of said one or more mobile devices; and
   controlling the displaying of the photographic identification data based on input by a user of the authorization-checking device, wherein the controlling comprises modifying at least a portion of a displayed image corresponding to the photographic identification data.

2. The method according to claim 1, wherein said photographic identification data is a photographic representation of at least a face of one of said one or more users of said one or more mobile devices.

3. The method according to claim 1, wherein the authorization data comprises an International Mobile Subscriber Identification number.

4. The method according to claim 1, wherein said photographic identification data is displayed by a virtual retina display.

5. An authorization-checking device for verifying personal electronic authorization data stored in mobile devices, said authorization-checking device comprising one or more circuits enabled to:
   receive via close range contactless communication photographic identification data from one or more mobile devices, where said one or more mobile devices store authorization data and said photographic identification data associated with one or more users of said one or more mobile devices on a removable identification chipcard in said one or more mobile devices; and
   display said photographic identification data visually, wherein said visually reproduced photographic identification data provides a user of said authorization-checking device with a comparison of the appearance of said one or more users of said one or more mobile devices for verifying said stored authorization data is associated with said one or more users of said one or more mobile devices, wherein the displaying of the photographic identification data is controlled based on input by a user of the authorization-checking device, and the controlling comprises modifying at least a portion of a displayed image corresponding to the photographic identification data.

6. The authorization-checking device according to claim 5, wherein said photographic identification data is a photographic representation of at least a face of one of said one or more users of said one or more mobile devices.

7. The authorization-checking device according to claim 5, wherein the authorization data comprises an International Mobile Subscriber Identification number.

8. The authorization-checking device according to claim 5, further comprising a virtual retina display enabled to display said photographic identification data.

\* \* \* \* \*